(12) United States Patent
Das et al.

(10) Patent No.: US 11,604,738 B2
(45) Date of Patent: Mar. 14, 2023

(54) DEVICE AND METHOD FOR DATA COMPRESSION USING A METADATA CACHE

(71) Applicant: Advanced Micro Devices, Inc., Santa Clara, CA (US)

(72) Inventors: Shomit N. Das, Austin, TX (US); Matthew Tomei, Champaign, IL (US); David A. Wood, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/146,543

(22) Filed: Sep. 28, 2018

(65) Prior Publication Data

US 2020/0104262 A1 Apr. 2, 2020

(51) Int. Cl.
*G06F 12/0897* (2016.01)
*G06F 12/0811* (2016.01)

(52) U.S. Cl.
CPC ...... *G06F 12/0897* (2013.01); *G06F 12/0811* (2013.01); *G06F 2212/401* (2013.01); *G06F 2212/466* (2013.01)

(58) Field of Classification Search
CPC ............ G06F 12/0897; G06F 12/0811; G06F 2212/401; G06F 2212/466
See application file for complete search history.

(56) References Cited

U.S. PATENT DOCUMENTS

2018/0138921 A1* 5/2018 Arelakis ................. H03M 7/48

OTHER PUBLICATIONS

Pekhimenko, G., "Practical Data Compression for Modern Memory Hierarchies", Computer Science Department, Carnegie Mellon University, Jul. 2016, 197 pages, Pittsburgh, PA, USA (downloaded from http://arxiv.org).

Liu, Z. et al., "G-Scalar: Cost-Effective Generalized Scalar Execution Architecture for Power-Efficient GPUs" 2017 IEEE International Symposium on High Performance Computer Architecture, Feb. 4-8, 2017, p. XXX, IEEE, Austin, TX, USA.

Langdon, G. G., "An Introduction to Arithmetic Coding," IBM Journal of Research and Development, vol. 28, No. 2, pp. 135-149, Mar. 1984.

(Continued)

*Primary Examiner* — David Yi
*Assistant Examiner* — Dustin B. Fulford
(74) *Attorney, Agent, or Firm* — Volpe Koenig (57) ABSTRACT

A processing device is provided which includes memory comprising data cache memory configured to store compressed data and metadata cache memory configured to store metadata, each portion of metadata comprising an encoding used to compress a portion of data. The processing device also includes at least one processor configured to compress portions of data and select, based on one or more utility level metrics, portions of metadata to be stored in the metadata cache memory. The at least one processor is also configured to store, in the metadata cache memory, the portions of metadata selected to be stored in the metadata cache memory, store, in the data cache memory, each portion of compressed data having a selected portion of corresponding metadata stored in the metadata cache memory. Each portion of compressed data, having the selected portion of corresponding metadata stored in the metadata cache memory, is decompressed.

20 Claims, 5 Drawing Sheets

(56) References Cited

OTHER PUBLICATIONS

Arelakis, A. et al., "SC2: A Statistical Compression Cache Scheme" Proceeding of the 41st Annual International Symposium on Computer Architecture, Jun. 14-18, 2014, pp. 145-156, IEEE Press, Minneapolis, MN, USA.

Sathish, V. et al., "Lossless and Lossy Memorry I/O Link Compression for Improving Performance of GPGPU Workloads", Proceedings of the 21st International Conference on Parallel Architectures and Compilation Techniques, Sep. 19-23, 2012, pp. 325-334, ACM, Minneapolis, MN, USA.

* cited by examiner

DEVICE AND METHOD FOR DATA COMPRESSION USING A METADATA CACHE

STATEMENT REGARDING GOVERNMENT INTEREST

This invention was made with Government support under the PathForward Project with Lawrence Livermore National Security (Prime Contract No. DE-AC52-07NA27344, Subcontract No. B620717) awarded by the DOE. The Government has certain rights in this invention.

BACKGROUND

The constant movement of data (e.g., video data) at various memory hierarchies of on-chip network architectures increases the memory bandwidth (i.e., the rate at which the data can be read from or stored into memory) as well as power consumption. To reduce memory bandwidth and power consumption, the data is typically encoded (e.g., compressed) using any number of different types of encoding (e.g., compression) techniques.

Conventional encoding techniques include compressing data at various stages of a data processing pipeline (e.g., link compression, cache compression and register file compression) depending on a particular objective. For example, link compression shares a model of the data at the encoding and decoding sides of the on-chip links to provide high compression ratios (e.g., ratio between the uncompressed size of data and compressed size of the data or ratio between compressed data rate and uncompressed data rate), which reduces the amount of data (or data rate) sent between links. Cache compression stores additional cache lines in compressed form, which increases cache capacity without increasing cache size (e.g., cache area).

BRIEF DESCRIPTION OF THE DRAWINGS

A more detailed understanding can be had from the following description, given by way of example in conjunction with the accompanying drawings wherein.

DETAILED DESCRIPTION

While link compression and cache compression each both provide unique advantages, combining the two different compression techniques to obtain their respective advantages poses significant challenges. Link compression techniques compress data at one side of link (e.g., a bus) and then transmit the compressed data via the link to another side of the link. The compressed data is decompressed, at the other side of the link, in the same order that the data is compressed and then stored in memory (e.g., cache memory). When cache compression is added to link compression (i.e. combined link and cache compression), the compressed data is stored in the cache prior to being decompressed and then decompressed when it is accessed from the cache. The compressed data stored in the cache, however, is accessible in any order. Accordingly, when combined link and cache compression is used, the compressed data is, for example, not accessed, and therefore not decompressed, in the same order in which the data is compressed.

Some conventional compression techniques include encoding algorithms which match patterns to eliminate redundancy in the cache lines. These encoding algorithms, however, are typically chosen prior to run time (e.g., at design time), which assumes a priori knowledge (e.g., knowledge of codeword probabilities). In addition, these encoding algorithms typically include storing metadata with each cache line, limiting the size of the metadata. Other conventional compression techniques use a single compression model of the data in the cache throughout the execution of an application, such that the model is unchangeable and is shared by all accesses during execution of the application. Link compression techniques are not limited by an unchangeable model, however, and maintain a model of the data at both ends of the link which is updated during execution of the application as data is seen on the link.

The present application describes devices and methods for compressing data using metadata caching to facilitate decompression of the compressed data stored in the cache. The devices and methods described herein achieve high compression ratios provided by link compression, while maintaining the increased cache capacity of cache compression.

A portion of compressed data is stored in a data cache when a corresponding portion of metadata, which includes an encoding used to compress the portion of compressed data and an updated model of the data, is stored in a metadata cache. The metadata is stored in the metadata cache based on at least one utility level metric. Utility metrics of data currently stored in the data cache are also used as a prediction of future utility metrics for data to be stored in the data cache.

A processing device is provided which includes memory comprising data cache memory configured to store compressed data and metadata cache memory configured to store metadata, each portion of metadata comprising an encoding used to compress a portion of data. The processing device also includes at least one processor configured to compress portions of data and select, based on at least one utility level metric, portions of metadata to be stored in the metadata cache memory. The at least one processor is also configured to store, in the metadata cache memory, the portions of metadata selected to be stored in the metadata cache memory, store, in the data cache memory, each portion of compressed data having a selected portion of corresponding metadata stored in the metadata cache memory. Each portion of compressed data, having the selected portion of corresponding metadata stored in the metadata cache memory, is decompressed.

A data processing method is provided which includes compressing portions of data and selecting, based on at least one utility level metric, portions of metadata to be stored in a metadata cache portion of memory. Each portion of metadata comprising an encoding used to compress a portion of data. The method also includes storing, in the metadata cache portion of memory, the portions of metadata selected to be stored in the metadata cache portion of memory and storing, in a data cache portion of memory, each portion of compressed data having a selected portion of corresponding metadata stored in the metadata cache portion of memory. The method further includes decompressing each portion of compressed data having the selected portion of corresponding metadata stored in the metadata cache portion of memory.

A non-transitory computer readable medium is provided having instructions for causing a computer to execute a data processing method including compressing portions of data and selecting, based on at least one utility level metric, portions of metadata to be stored in a metadata cache portion of memory, each portion of metadata comprising an encoding used to compress a portion of data. The method also includes storing, in the metadata cache portion of memory, the portions of metadata selected to be stored in the metadata cache portion of memory and storing, in a data cache portion of memory, each portion of compressed data having a selected portion of corresponding metadata stored in the metadata cache portion of memory. The method also includes decompressing each portion of compressed data having the selected portion of corresponding metadata stored in the metadata cache portion of memory.

As used herein, programs include sequences of instructions to be executed using at least one processor to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems.

Figure 1:
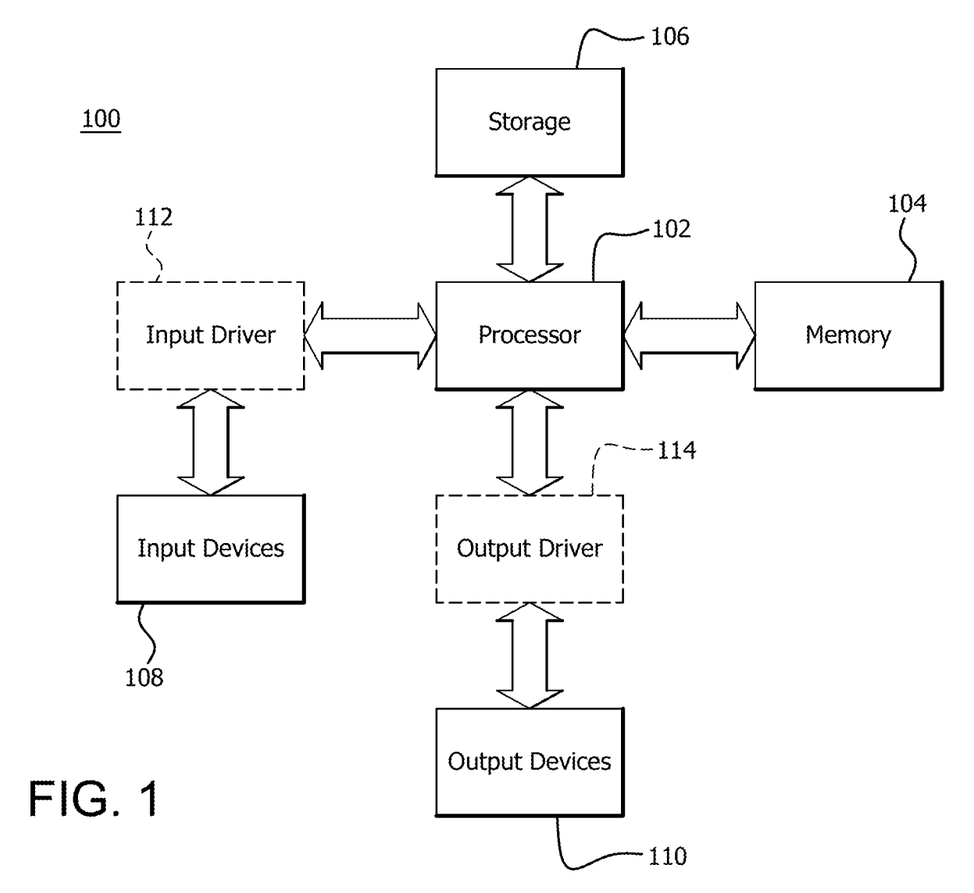
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes volatile or non-volatile memory, for example, random access memory (RAM), including dynamic RAM (DRAM) and static RAM (SRAM). The memory 104 includes cache memory such as a data cache and a metadata cache, as described in detail herein.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

One or more components, such as processor 102, and memory 104 described herein are, for example, components a system on chip (SOC) used in an integrated circuit (e.g., application-specific chip) included in device 100.

Figure 2:
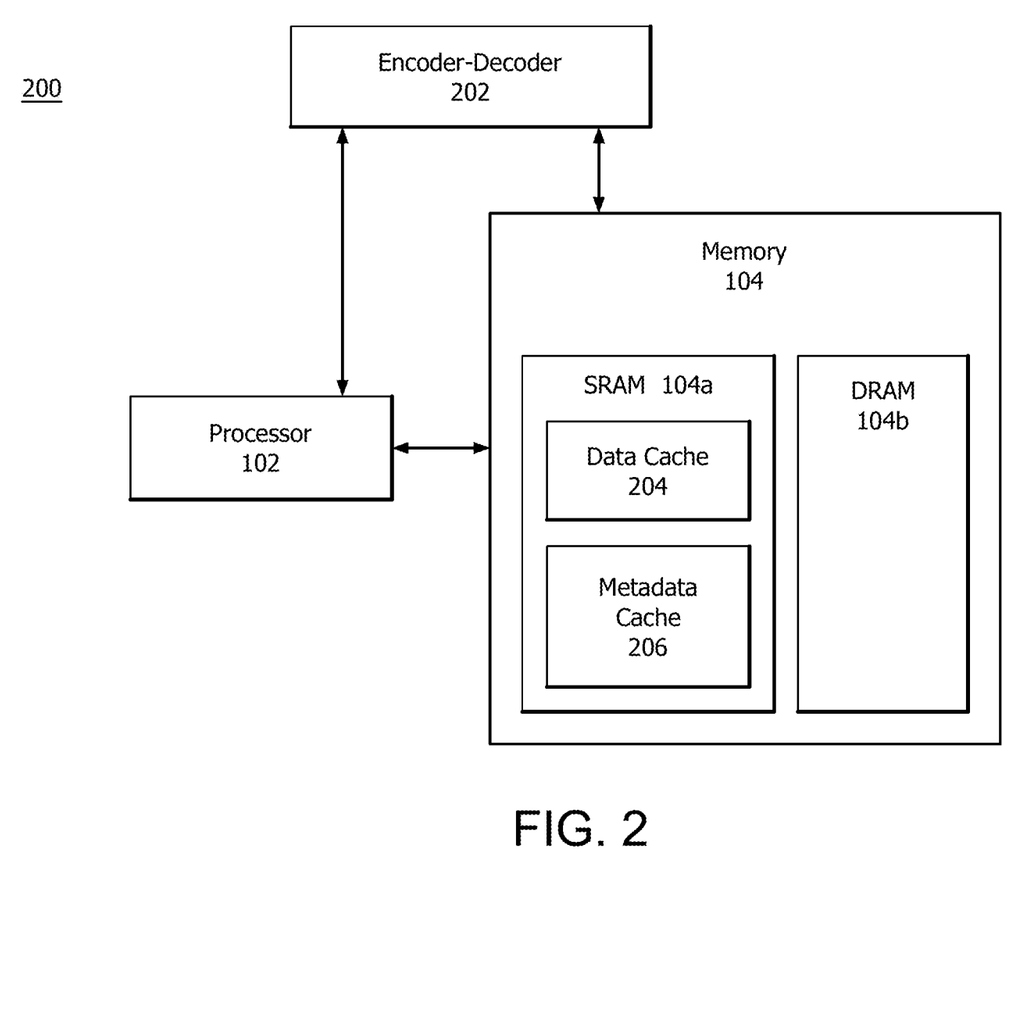
FIG. 2 is a block diagram illustrating exemplary components of a processing device in which one or more features of the disclosure can be implemented.

FIG. 2 is a block diagram illustrating exemplary components of a processing device 200 in which one or more features of the disclosure can be implemented. Processing device 200 is used to compress data (e.g., video data) using metadata caching to facilitate decompression of compressed data stored in the cache, as described in more detail below.

As shown in FIG. 2, processing apparatus 200 includes processor 102, memory 104 and encoder-decoder 202 (e.g., a CODEC). Processor 102 is in communication with memory 104 and is configured to process data (e.g., read data, write data) using the memory 104 to execute the program. Encoder-decoder 202 is configured to compress and decompress data, such as video data using various encodings. The memory 104 includes SRAM 104a and DRAM 104b. Memory 104 includes data cache 204, which is a portion of SRAM 104a, used to store data for executing a program. The memory 104 also includes metadata cache 206, which is a portion of SRAM 104a used to store metadata. Processor 102 is configured to control the data cache 204 and metadata cache 206.

The metadata, stored in metadata cache 206, includes encodings, each of which are used to compress a portion of data stored in the data cache 204 (e.g., data stored in one or more cache lines) and a model (e.g., model 302 shown in FIG. 3) of each portion of data from which the encodings are derived.

Figure 3:
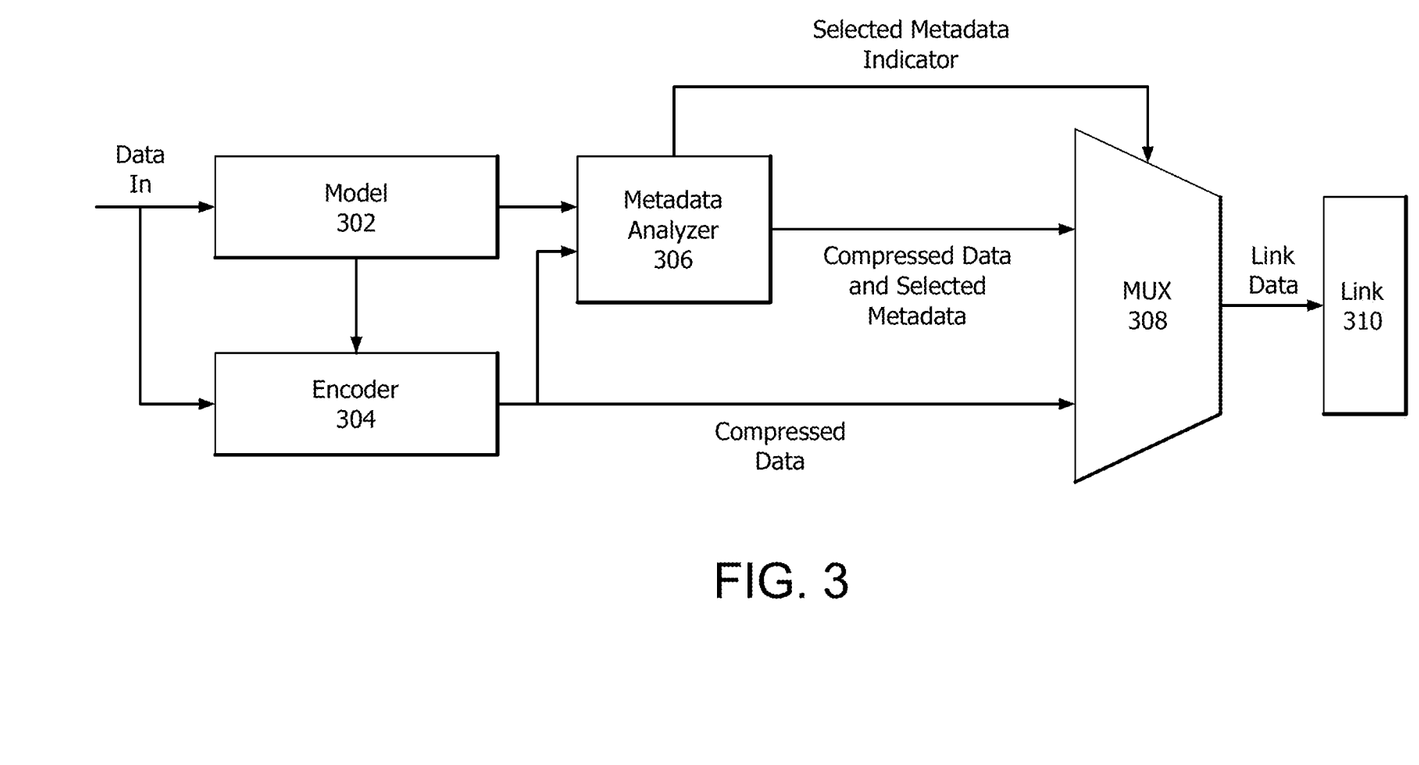
FIG. 3 is a block diagram illustrating an example flow of processing data at a first side of a link of a processing device in which one or more features of the disclosure can be implemented.

FIG. 3 is a block diagram illustrating an example flow of processing data at a first side of a link 310 of a processing device (e.g., processing device 200 in FIG. 2).

As shown in FIG. 3, the data (i.e., data in) is received at model 302. The model 302, which includes any type of information or statistics (e.g., data patterns) about the information used to compress the data, is continuously updated as the data changes. Based on the received portion of data, the processor 102 determines and updates a model 302 of the data.

The updated model 302 of the data is provided to the encoder 304, which uses the updated model 302 to derive an encoding to compress the portion of data. Encoder 304 is, for example, implemented in hardware (e.g., a part of encoder-decoder 202 shown in FIG. 2), software or a combination of hardware and software used to compress data for executing a program. Encoder 304 is, for example, controlled by processor 102 to compress each portion of data using an encoding. Alternatively, encoder 304 includes a dedicated processor to compress the data. Each encoding is a way or a process of representing a portion of data in a format to achieve an objective, such as compression of the portion of data.

Each portion of compressed data, compressed by encoder 304, is provided to multiplexor (MUX) 308 as shown at the bottom input to MUX 308 in FIG. 3. Each portion of compressed data and the updated model 302 of the data is also analyzed at metadata analyzer 306. The metadata analyzer 306 includes, for example, programmed instructions which instruct processor 102 to determine whether to select a corresponding portion of metadata based on the data compressed by encoder 304 and the updated model 302. That is, based on the updated model 302 of the data, processor 102 receives instructions from metadata analyzer 306 to determine, for each portion of compressed data received by metadata analyzer 306 from encoder 304, whether a corresponding portion of metadata (i.e., the metadata which includes the encoding used to compress the portion of data), is selected to be provided with the portion of compressed data across link 310 (e.g., a bus) of the processing device and stored in the metadata cache 206.

For example, the processor 102 determines whether a corresponding portion of metadata is selected based on a utility level of the metadata. A utility level of a portion of metadata is dynamically determined by the processor 102 according to at least one utility level metric. Utility metrics include, for example, a compression ratio of the portion of data, an amount of common data (e.g., data having the same encoding used for compression) stored in the data cache 204 and a decompression efficiency value for the portion of data. The compression ratio includes a ratio between the uncompressed size of the portion of data and the compressed size of the portion of data or the ratio between a compressed data rate and an uncompressed data rate. The decompression efficiency value is a value which is determined, for example, as a cost of decompression as a function of latency and power consumption. In addition to latency and power consumption, the decompression efficiency value is also determined as a cost of decompression as a function of decoder area when a decoder is implemented in hardware.

A utility metric of a portion of compressed data is, for example, compared, by processor 102, to a utility metric threshold to determine whether to select a corresponding portion of metadata to be stored in the metadata cache. When the utility metric of a portion of compressed data is equal to a utility metric threshold or beyond a utility metric threshold (e.g., less than a utility metric threshold, greater than a utility metric threshold or outside a utility metric threshold range), a portion of metadata is selected to be stored in the metadata cache.

Each metric threshold is determined, for example, prior to run time for a particular use case (e.g., a particular application to be executed). Additionally, or alternatively, the threshold utility level is dynamically changed during runtime of the application based on the updated model 302 of the data.

Determining whether to select a portion of metadata is also based on future utility metrics of data. The utility metrics of data currently stored in the data cache 202 are used for predicting (e.g., determining a probability) future utility metrics of data to be stored in the data cache 202. The determination of whether to select a portion of metadata is, for example, based on a probability that one or more of the utility metrics for the data currently stored in the data cache 202 will be maintained for a predetermined amount of time or a predetermined number of clock cycles. Alternatively or additionally, the determination is based on a probability that one or more of the utility metrics of data to be stored will be equal to or beyond a utility metric threshold.

When more than one utility metric is used, the utility metrics are, for example, assigned weight factors. The determination of whether to select a portion of metadata is based on the weight factors of the utility metrics. The weight factors are determined prior to runtime in order to execute a particular application and additionally, or alternatively, are dynamically determined during runtime based on an updated model of the data.

When a portion of metadata is selected by the processor 102, a selected portion of metadata and the corresponding portion of compressed data are provided to the MUX 308, as shown at the middle input to MUX 308 in FIG. 3. A selected metadata indicator (e.g., a value of 1) is also provided to the MUX 308, as shown at the top input to MUX 308 in FIG. 3. The selected metadata indicator causes the MUX 308 to provide the selected portion of metadata and the corresponding portion of compressed data, received at the middle input to MUX 308, to be provided as link data across link 310 of the processing device.

When a portion of metadata is not selected by the processor 102 to be provided to multiplexor (MUX) 308, the corresponding portion of compressed data received at the bottom input to MUX 308 in FIG. 3 is selected and provided across link 310 without the portion metadata. The corresponding portion of compressed data selected without the metadata, for example, using a different metadata indicator (e.g., having a value of 0).

The MUX 308 is merely an example of combination logic used to select and provide the compressed data or the compressed data and selected portion of metadata as the link data. For example, combination logic includes providing data across the link 310 based on a a single metadata indicator value. When no metadata indicator value is received, one of the combined metadata and corresponding compressed data or the corresponding data alone (i.e., one of the 2 inputs) is selected and, when the single metadata indicator value is received, the other of the 2 inputs is provided across the link 310. The compressed data and selected portion of metadata is for example, provided via other hardware (e.g., logic circuitry), software or a combination of hardware and software.

Figure 4:
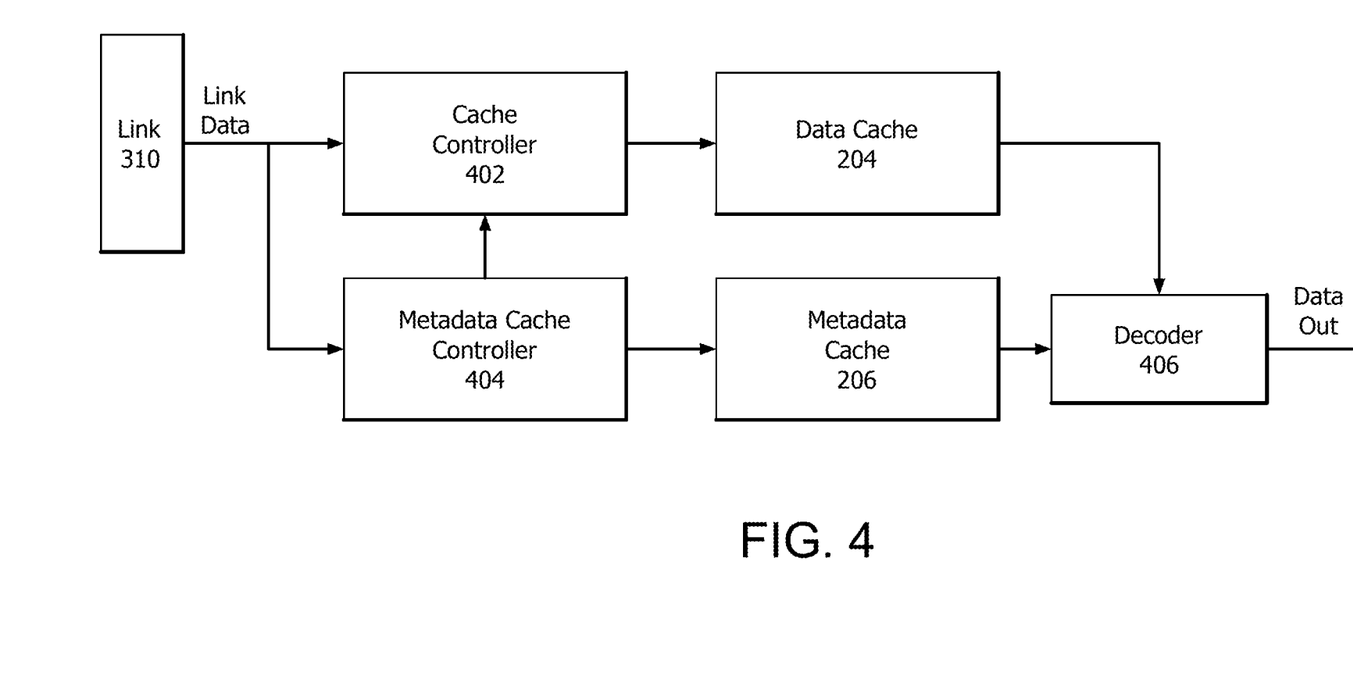
FIG. 4 is a block diagram illustrating an example flow of processing the data at a second side of a link of the processing device shown in FIG. 3.

FIG. 4 is a block diagram illustrating an example flow of processing the data at a second side of the link 310 of the processing device shown in FIG. 3. The metadata cache controller 404 and the data cache controller 402 are shown as separate controllers in FIG. 4. Alternatively, the metadata cache controller 404 and the data cache controller 402 are configured as a single controller (e.g., single processor 102). For simplification of explanation, the example flow of processing the link data is illustrated using separate metadata and data cache controllers. Decoder 406 is, for example, implemented in hardware (e.g., a part of encoder-decoder 202 shown in FIG. 2), software or a combination of hardware and software. Decoder 406 is, for example, controlled by processor 102 to decompress data compressed by encoder 304 shown in FIG. 3 and accessed in data cache 204. Alternatively, decoder 406 includes a dedicated processor to decompress the data.

As shown in FIG. 4, the link data is received at the second side of the link 310 of the processing device (e.g., processing device 200) shown in FIG. 3. The link data is received (e.g., fetched) by the cache controller 402 as well as the metadata cache controller 404.

The metadata cache controller 402 determines whether or not the link data includes the selected portion of metadata (i.e., the portion of metadata having the encoding used to compress a corresponding portion of data). When the metadata cache controller 402 determines that the link data includes a selected portion of metadata, the selected portion of metadata is stored in the metadata cache 206. When the metadata cache controller 402 determines that the link data does not include the selected portion of metadata, no metadata (i.e., no metadata corresponding to a portion of compressed data) is stored in the metadata cache 206.

The metadata cache controller 404, which is in communication with the data cache controller 402, controls or instructs the data cache controller 402 to store a portion of compressed data in the data cache 204 when a corresponding selected portion of metadata is stored in the metadata cache (i.e., when the encoding used to encode the portion of compressed data is stored in the metadata cache). The metadata cache controller 404 controls or instructs the data cache controller 402 to invalidate any data in the cache which does not include a corresponding selected portion of metadata stored in the metadata cache 206. The metadata is provided to decoder 406. Accordingly, at the request of the processor (e.g., metadata cache controller 404), decoder 406 uses the metadata to decompress the compressed data stored in the data cache 204.

Figure 5:
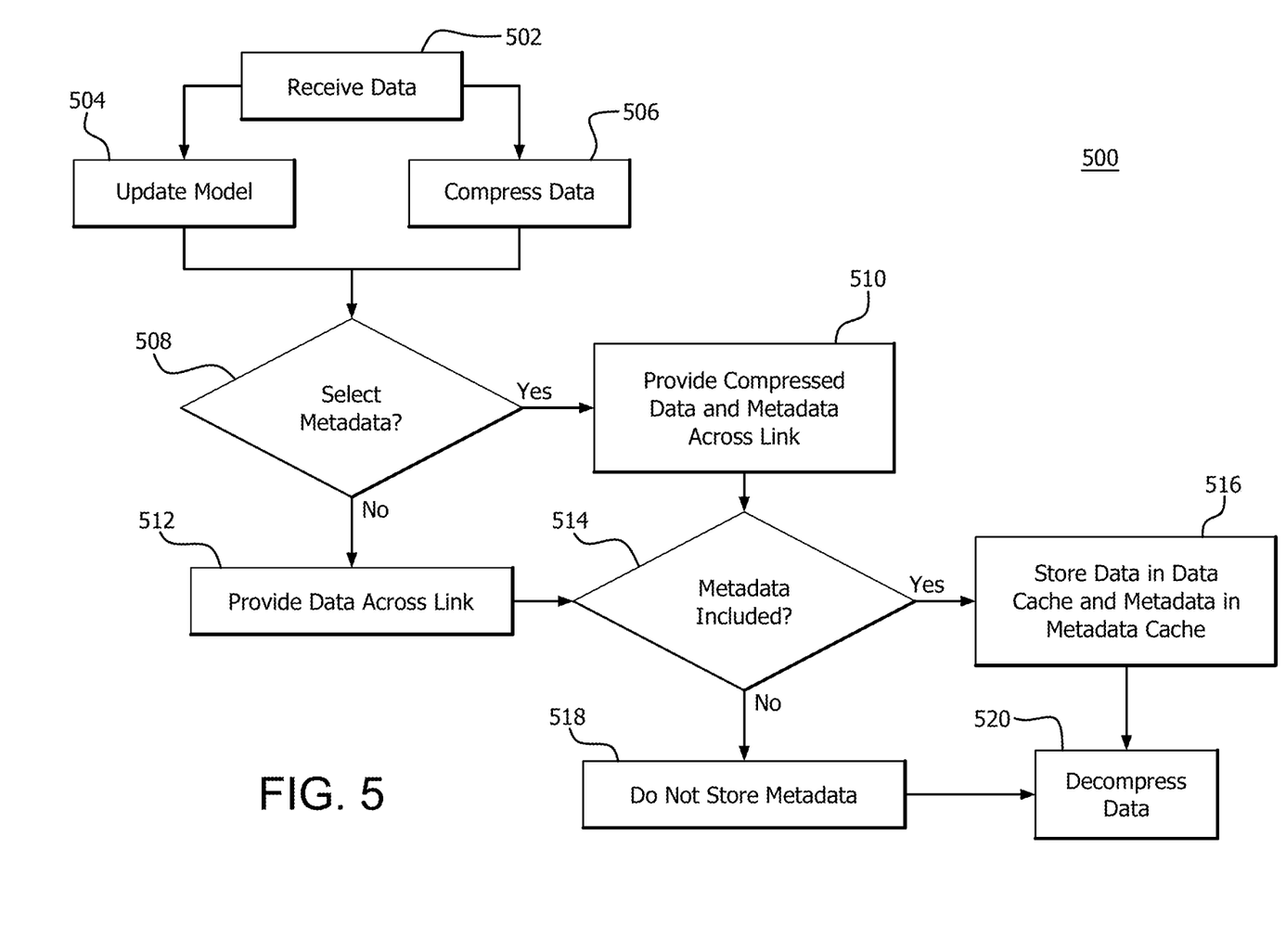
FIG. 5 is a flow diagram illustrating an example method of compression data using a metadata cache according to features of the disclosure.

FIG. 5 is a flow diagram illustrating an example method 500 of compression data using a metadata cache according to features of the disclosure. As shown at block 502, the method 500 includes receiving a portion of data. For example, processor 102 receives (fetches) a portion of data to be processed.

As shown at block 504, the method 500 includes updating a model of the data. That is, as a new portion of data is received, the model of the data, includes any type of information or statistics (e.g., data patterns) about the information used to compress the portion of data, is updated. At block 506, the portion of data is compressed using an encoding derived from the updated model of the data.

At decision block 508, the method 500 includes determining whether to select a corresponding portion of metadata (i.e., the metadata which includes the encoding used to compress the portion of data), to be provided with the portion of compressed data across a link and stored in the metadata cache.

For example, a corresponding portion of metadata is selected based on one or more a utility level metrics, such as a compression ratio, an amount of common data and a decompression efficiency value.

When a corresponding portion of metadata is selected, the portion of metadata is selected to be provided along with the corresponding portion of compressed data (e.g., combined in same data stream) as link data to another side of a link, as shown at block 510. When a corresponding portion of metadata is not selected, the corresponding portion of compressed data is provided as the link data without the portion of metadata, as shown at block 512.

As shown at decision block 514, the method 500 includes determining whether or not the link data includes a portion of metadata (i.e., the selected portion of metadata) having an encoding used to compress a corresponding portion of data. When the link data includes a portion of metadata, the portion of metadata is stored in a metadata cache portion (e.g., metadata cache 206), as shown at block 516. When the link data does not include the selected portion of metadata, no metadata is stored in a metadata cache portion, as shown at block 518.

As shown at block 520, the portion of compressed data stored in the data cache portion is accessed and decompressed using the corresponding portion of metadata.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory comprising:
      data cache memory configured to store compressed data; and
      metadata cache memory configured to store metadata, each portion of metadata comprising an encoding used to compress a portion of data; and
   at least one processor configured to:
      compress portions of data;
      for the portions of data which are compressed, based on at least one utility level metric of the compressed portions of data,
         select first portions of metadata, each corresponding to a different one of compressed first portions of data, to be sent and stored in the metadata cache memory;
      send, to the metadata cache memory, only the selected first portions of metadata;
      store, in the metadata cache memory, the selected first portions of metadata; and
      store, in the data cache memory, each first portion of compressed data having a selected first portion of corresponding metadata stored in the metadata cache memory,
      wherein each first portion of compressed data, having the selected first portion of corresponding metadata stored in the metadata cache memory, is decompressed.

2. The processing device according to claim 1, wherein the at least one utility level metric comprises at least one of:
   a compression ratio of one portion of data;

an amount of common portions of data each having the encoding used to compress the one portion of data; and
a decompression efficiency value.

3. The processing device according to claim 2, wherein the at least one processor is further configured to:
update a data model from which the encoding is derived, the data model comprising information about the encoding and the one portion of data; and
select the first portions of metadata to be stored in the metadata cache memory based on the at least one utility level metric and the updated data model.

4. The processing device according to claim 3, wherein the at least one processor is further configured to predict future utility level metrics of data to be stored in the data cache memory based on utility metrics of data currently stored in the data cache memory.

5. The processing device according to claim 1, wherein the at least one processor is further configured to:
compare the at least one utility level metric to a corresponding utility level metric threshold;
select the first portions of metadata to be sent and stored in the metadata cache memory when the at least one utility level metric is equal to or beyond the corresponding utility level metric threshold; and
select second portions of metadata, each corresponding to a different one of compressed second portions of data, not to be sent and stored in the metadata cache memory when the at least one utility level metric is not equal to or beyond the corresponding utility level metric threshold.

6. The processing device according to claim 2, wherein the at least one processor is further configured to:
compare a plurality of utility level metrics to a plurality of corresponding utility level metric thresholds; and
select one of the first portions of metadata, corresponding to one of the compressed first portions of data, by weighing the plurality of utility level metrics according to weight factors assigned to each one of the utility level metrics.

7. The processing device according to claim 1, wherein the at least one processor is further configured to:
combine a first portion of compressed data with a selected first portion of corresponding metadata; and
provide the first portion of compressed data and the selected first portion of corresponding metadata across a link of the processing device.

8. The processing device according to claim 1, wherein the at least one processor is further configured to:
receive the compressed portions of data and the selected first portions of metadata across a link of the processing device; and
determine whether or not a compressed portion of data received across the link includes a selected first portion of corresponding metadata.

9. The processing device according to claim 8, wherein the at least one processor is further configured to:
when it is determined that the compressed portion of data received across the link includes the selected first portion of corresponding metadata, store the selected first portion of corresponding metadata in the metadata cache memory and store the portion of compressed data in the data cache memory; and
when it is determined that the compressed portion of data received across the link does not include the selected first portion of corresponding metadata, do not store the portion of compressed data in the data cache memory.

10. A data processing method comprising:
compressing portions of data;
for the portions of data which are compressed, based on at least one utility level metric of the compressed portions of data, selecting first portions of metadata, each corresponding to a different one of compressed first portions of data, to be sent and stored in a metadata cache memory, each first portion of metadata comprising an encoding used to compress a first portion of data;
sending, to the metadata cache memory, only the selected first portions of metadata;
storing, in the metadata cache memory, the selected first portions of metadata;
storing, in a data cache memory, each first portion of compressed data having a selected first corresponding metadata stored in the metadata cache memory; and
decompressing each first portion of compressed data having the selected first portion of corresponding metadata stored in the metadata cache memory.

11. The method of claim 10, wherein the at least one utility level metric comprises at least one of:
a compression ratio of one portion of data;
an amount of common portions of data each having the encoding used to compress the one portion of data; and
a decompression efficiency value.

12. The method of claim 11, further comprising:
updating a data model from which the encoding is derived, the data model comprising information about the encoding and the one portion of data; and
selecting the first portions of metadata to be stored in the metadata cache memory based on the at least one utility level metric and the updated data model.

13. The method of claim 12, further comprising predicting future utility level metrics of data to be stored in the data cache memory based on utility metrics of data currently stored in the data cache memory.

14. The method of claim 10, further comprising:
comparing the at least one utility level metric to a corresponding utility level metric threshold;
selecting the first portions of metadata to be sent and stored in the metadata cache memory when the at least one utility level metric is equal to or beyond the corresponding utility level metric threshold; and
selecting second portions of metadata, each corresponding to a different one of compressed second portions of data, not to be sent and stored in the metadata cache memory when the at least one utility level metric is not equal to or beyond the corresponding utility level metric threshold.

15. The method of claim 11, further comprising:
comparing a plurality of utility level metrics to a plurality of corresponding utility level metric thresholds; and
selecting one of the first portions of metadata, corresponding to one of the compressed first portions of data, by weighing the plurality of utility level metrics according to weight factors assigned to each one of the utility level metrics.

16. The method of claim 10, further comprising:
combining a first portion of compressed data with a selected first portion of corresponding metadata; and
providing the first portion of compressed data and the selected first portion of corresponding metadata across a link of a processing device.

17. The method of claim 10, further comprising:
receiving the compressed portions of data and the selected first portions of metadata across a link of a processing device; and determining whether or not a compressed portion of data received across the link includes a selected first portion of corresponding metadata.

18. The method of claim 17, further comprising:
when it is determined that the compressed portion of data received across the link includes the selected first portion of corresponding metadata, store the selected first portion of corresponding metadata in the metadata cache memory and store the portion of compressed data in the data cache memory; and
when it is determined that the compressed portion of data received across the link does not include the selected first portion of corresponding metadata, do not store the portion of compressed data in the data cache memory.

19. A non-transitory computer readable medium having instructions for causing a computer to execute a data processing method comprising:
compressing portions of data;
for the portions of data which are compressed, based on at least one utility level metric of the compressed portions of data, selecting first portions of metadata, each corresponding to a different one of compressed first portions of data, to be sent and stored in a metadata cache memory, each first portion of metadata comprising an encoding used to compress a first portion of data;
sending, to the metadata cache memory, only the selected first portions of metadata;
storing, in the metadata cache memory, the first portions of metadata selected to be sent and stored in the metadata cache memory;
storing, in a data cache memory, each first portion of compressed data having a selected first portion of corresponding metadata stored in the metadata cache memory; and
decompressing each first portion of compressed data having the selected first portion of corresponding metadata stored in the metadata cache memory.

20. The non-transitory computer readable medium of claim 19, wherein the at least one utility level metric comprises at least one of:
a compression ratio of one portion of data;
an amount of common portions of data each having the encoding used to compress the one portion of data; and
a decompression efficiency value.

\* \* \* \* \*